United States Patent [19]
Buhl et al.

[11] Patent Number: 5,312,200
[45] Date of Patent: May 17, 1994

[54] BALL JOINT WITH SEALING CUFF FOR MOTOR VEHICLES

[75] Inventors: Herr R. Buhl, Bohmte; Herr W. Kleiner, Wagenfeld, both of Fed. Rep. of Germany

[73] Assignee: Lemforder Metallwaren AG, Lemforde, Fed. Rep. of Germany

[21] Appl. No.: 582,433

[22] Filed: Sep. 13, 1990

[30] Foreign Application Priority Data

Sep. 14, 1989 [DE] Fed. Rep. of Germany ....... 3930740

[51] Int. Cl.$^5$ ............................................. F16C 11/06
[52] U.S. Cl. ..................................... 403/134; 403/122; 403/51; 403/288; 277/212 FB
[58] Field of Search .............. 403/134, 122, 51, 50, 403/288, 282, 135, 140, 127-133; 277/212 FB; 384/203, 206; 29/898.043, 898.044, 898.047

[56] References Cited

U.S. PATENT DOCUMENTS

| | | | |
|---|---|---|---|
| 3,429,599 | 2/1969 | Schmidt | 277/212 FB X |
| 3,472,540 | 10/1969 | Gottschald | 403/51 |
| 3,476,417 | 11/1969 | Born et al. | 403/134 |
| 3,545,797 | 12/1970 | Korecky | 403/140 |
| 4,220,418 | 9/1980 | Kondo et al. | 277/212 FB X |
| 4,386,869 | 7/1983 | Smith | 403/134 X |
| 4,419,027 | 12/1983 | Trudeau | 403/134 |
| 4,527,803 | 7/1985 | Rose | 403/134 X |
| 4,572,693 | 2/1986 | Nemoto | 403/134 |
| 4,650,362 | 3/1987 | Kubo | 403/134 |
| 4,967,609 | 11/1990 | Takagi et al. | 277/212 FB X |
| 5,005,808 | 4/1991 | Warmuth, II et al. | 403/134 X |

FOREIGN PATENT DOCUMENTS

| | | | |
|---|---|---|---|
| 3632265 | 4/1988 | Fed. Rep. of Germany | 403/134 |
| 1390714 | 1/1965 | France | 403/133 |
| 0228114 | 10/1986 | Japan | 403/122 |
| 1398106 | 6/1975 | United Kingdom | 403/132 |
| 2158892 | 11/1985 | United Kingdom | 277/212 FB |

Primary Examiner—Randolph A. Reese
Assistant Examiner—Harry C. Kim
Attorney, Agent, or Firm—McGlew and Tuttle

[57] ABSTRACT

To improve the corrosion protection at the connection site of the sealing cuff and the ball pivot, a ball joint with a sealing cuff (7), made of an elastically deformable material, is proposed, which is connected, with an edge profile (9), to a ball pivot (2) in a positive-locking manner in the direction of rotation around the longitudinal axis of the ball pivot (2) and has an elasticity that compensates for the maximum rotary and swiveling movements of the ball pivot (2) relative to the housing (1).

12 Claims, 6 Drawing Sheets

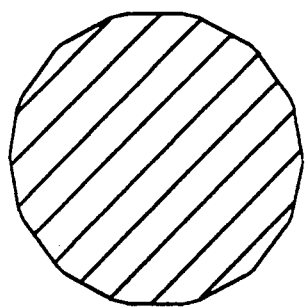
_Fig. 4a_

BALL JOINT WITH SEALING CUFF FOR MOTOR VEHICLES

FIELD OF THE INVENTION

The present invention pertains generally to a ball joint for motor vehicles, and more particularly to a sealing cuff formed of an elastically deformable material in which one end of the sealing cuff is fastened to an annular groove formed on the circumference of a ball joint housing and the other end of which includes an edge profile surrounding a ball pivot.

Designing the connection between the end of the sealing cuff that is the outer end relative to the housing of the ball joint and the ball pivot is problematic, because despite the deflecting movement and the rotary movement of the ball pivot relative to the housing, both radial and axial sealing between the ball pivot and the housing must be achieved.

In prior-art designs, one end of the sealing cuff is fastened sealingly on the housing, and its other end has a bead-like thickened area with an inner bearing surface, which is in direct contact with the generated surface of the ball pivot and which may be held thereon by the intrinsic tension of the material or by the tension of a spring ring mounted externally. Circular tongue-and-groove designs have been known for securing the axial position, but such designs make it difficult to achieve close contact between the radially directed support surface and the vehicle part containing the bearing lug for fastening the ball joint. The usually conical generated surface of the ball pivot, which makes possible safe fastening of the ball pivot in an inner cone of the bearing lug, also causes difficulties. Imperfect sealing of the radial seating of the seal and also of the axial seating of the seal can very easily lead to corrosion on the ball pivot and the vehicle part containing the bearing lug for fastening the ball pivot. Thus, the service life of a ball joint depends mainly on the extent to which it is possible to avoid corrosion in this area.

It is known from West German Patent No. DE-PS 37,05,847 that the edge profile of the sealing cuff on the ball pivot can be inserted into a retaining ring arranged on and adhering to the ball pivot, wherein the retaining ring is provided with a coating of an elastic material on the mounting surface and on the support surface with which it is supported on a vehicle part.

It is known from British Patent No. GB-PS 1,477,649 that one end of the sealing cuff, made of an elastically deformable material, can be fastened in an annular groove provided on the circumference of the housing, and a profile of the other end, which is positively-locked in the axial direction, can be inserted into a circumferential recess of a support ring arranged on and adhering to the ball pivot. This support ring has a bearing surface sealingly surrounding the ball pivot, as well as a support surface that is radial thereto, which is supported by the vehicle part containing the bearing lug for fastening the ball pivot. The sealing cuff with its seating surface is thus able to be temporarily lifted off from the support ring in order to enable air and excess grease to escape from the inner space of the sealing cuff. However, this measure is not directed toward corrosion protection.

Finally, it was proposed in Swiss Patent No. CH-PS 465,971 that the support ring, as is known West German Patent No. DE-PS 37,05,847, be made of a hard plastic which is rotatably surrounded by the bead of the sealing cuff, so that the sliding surface between the bead of the sealing cuff and the support ring is arranged in a protected depressed area.

SUMMARY AND OBJECT OF THE INVENTION

It is an object of the present invention to provide the most inexpensive connection possible between the outer end of the sealing cuff and the ball pivot, which connection is practically completely insensitive to corrosion.

According to the invention, a ball joint for motor vehicles is provided including a housing having an outer circumference. An annular groove is formed in the outer circumference of the housing. A joint ball is positioned in the housing, the joint ball having a ball pivot extending therefrom. A sealing cuff is provided made of an elastically deformable material. The sealing cuff includes an end fastened in the annular groove on the circumference on the housing. The other end of the sealing cuff includes an edge profile which surrounds the ball pivot sealingly and in a positive-locking manner with respect to the axial direction. The sealing cuff on the other end also includes means for connecting the other end to the ball pivot in a positive locking manner with respect to the direction of rotation around a longitudinal axis of the ball pivot. The sealing cuff is provided with rotational elasticity means for compensating for the maximum rotary and swivelling movements of the ball pivot relative to the housing.

The present invention is based on the idea that the bead of the sealing cuff should be fastened to the shaft of the ball pivot so that neither axial nor radial movements will be possible on the fastening parts and that the swiveling movements of the ball pivot relative to the housing, as well as the rotary movements of the ball pivot relative to the housing, are compensated for by the sealing cuff alone. To achieve this, the sealing cuff must be sufficiently wide and/or have sufficient elasticity. The rigid arrangement of the bead of the sealing cuff on the ball pivot avoids the formation of friction surfaces, which would lead to gap formation, so that moisture is also prevented from penetrating, and practically complete corrosion protection is achieved. Exemplified embodiments of the positive-locking connection between the edge profile of the sealing cuff and the ball pivot will be explained below.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 4a is a sectional view taken through the ball pivot in the area of fastening of the sealing cuff; and, FIG. 5 is a side view of another embodiment of the invention with a section according to FIG. 1.

DETAILED DESCRIPTION OF THE PREFERRED EMBODIMENT

Figure 1:
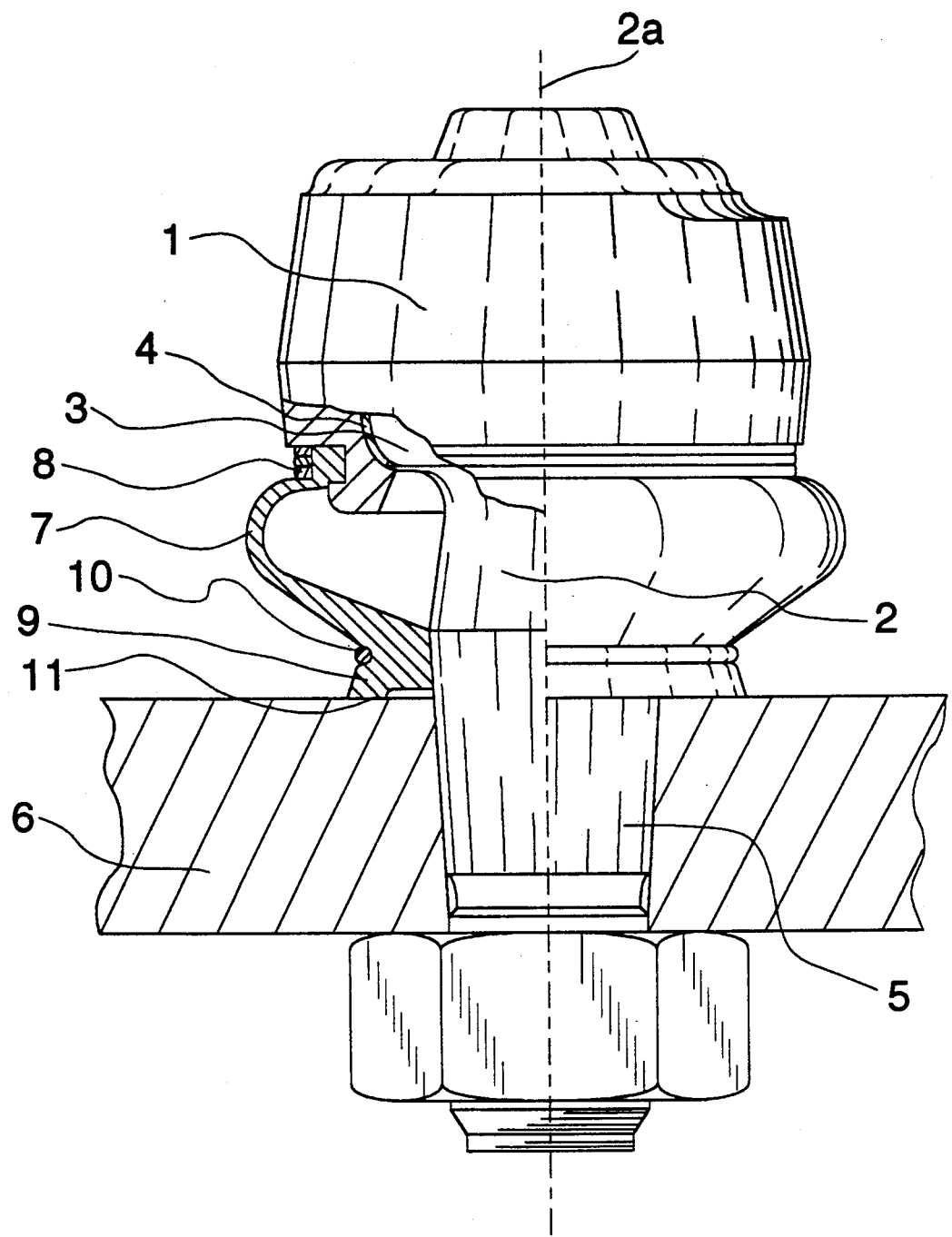
FIG. 1 is a side view of a ball joint according to the invention with partially cutaway sealing cuff.

The ball joint according to the embodiments consists of a housing 1 and the ball pivot 2 which is inserted with a joint ball 3, provided on one of its ends, into the housing 1 by means of a joint cup 4. The housing 1 can be connected by fastening means not recognizable in the drawing to a component of a motor vehicle, and a slightly tapered (and slightly conical) shaft part 5 of the ball pivot 2 can be connected to another vehicle part such as a bearing lug 6 of a motor vehicle. A sealing cuff 7, made of an elastic material, is provided between the housing 1 and the ball pivot 2, and one end of the sealing cuff is fastened to the housing 1, and its other end is fastened to the ball pivot 2. The fastening to the housing consists, for example, of a beaded edge at the end of the sealing cuff 7, which engages with a circumferential groove on the housing 1 and is fastened therein by means of one or several retaining rings 8.

The edge profile 9 is fastened to the other end of the sealing cuff 7 in a positive-locking manner, so that movements between the edge profile 9 of the sealing cuff 7 and the ball pivot 2 are impossible in the axial direction and the radial direction alike. In this case, the width of the sealing cuff 7 and/or its elasticity are to be selected such that rotary movements around the longitudinal axis 2a of the ball pivot 2 and rocking motions of the ball pivot 2 relative to the housing 1 are compensated for by the sealing cuff 7.

The general representation in FIG. 1 shows that the positive-locking connection can be achieved by both the ball pivot 2, in the area of the inner end of its conical shaft 5, and the inner cross section of the edge profile 9 of the sealing cuff 7 having a polygonal cross section. The inner cross section of the edge profile 9 is undersized relative to the outer cross section of the conical shaft part 5, so that the edge profile 9 is pushed over the polygonal cross section part of the shaft part 5 widened area. A retaining ring 10, e.g., a spring ring, can additionally surround the edge profile 9 from the outside and thus provide for firm seating of the edge profile 9 on the shaft part 5. With a support surface 11 on a circumferential lip of the edge profile, the latter is supported against the component 6, to which the ball pivot 2 is fastened.

Figure 2:
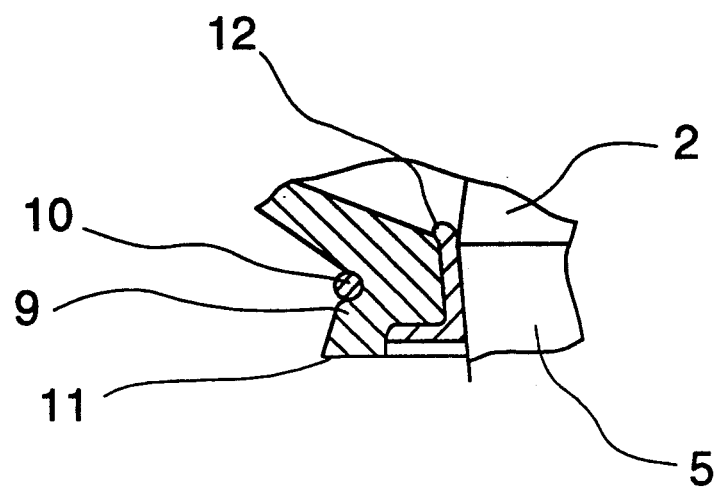
FIG. 2 is a partial sectional view through an embodiment of the invention with a support ring.

In deviation from FIG. 1, FIG. 2 shows an embodiment in which the edge profile 9 of the sealing cuff 7 is connected, e.g., by vulcanization, to a support ring 12 which is profiled corresponding to a polygonal cross section of the shaft part 5 and is undersized compared with the polygon of the shaft part 5, so that it widens while undergoing elastic deformation when pressed onto this polygon. A retaining ring 10 is additionally able to support the firm seating of the support ring 12 made of sheet metal or the like, which [support ring]is fastened by vulcanization, in this case as well.

Figure 3A:
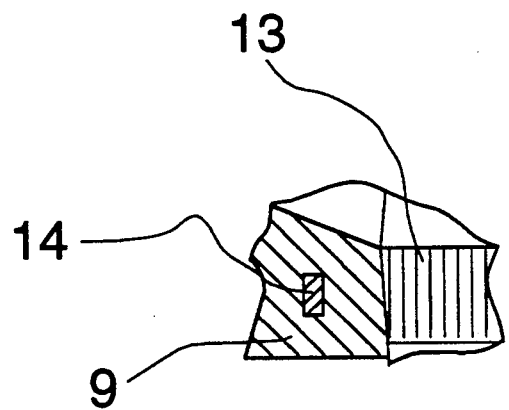
FIG. 3a is a detailed view of the embodiment of FIG. 3 on a larger scale.
Figure 3:
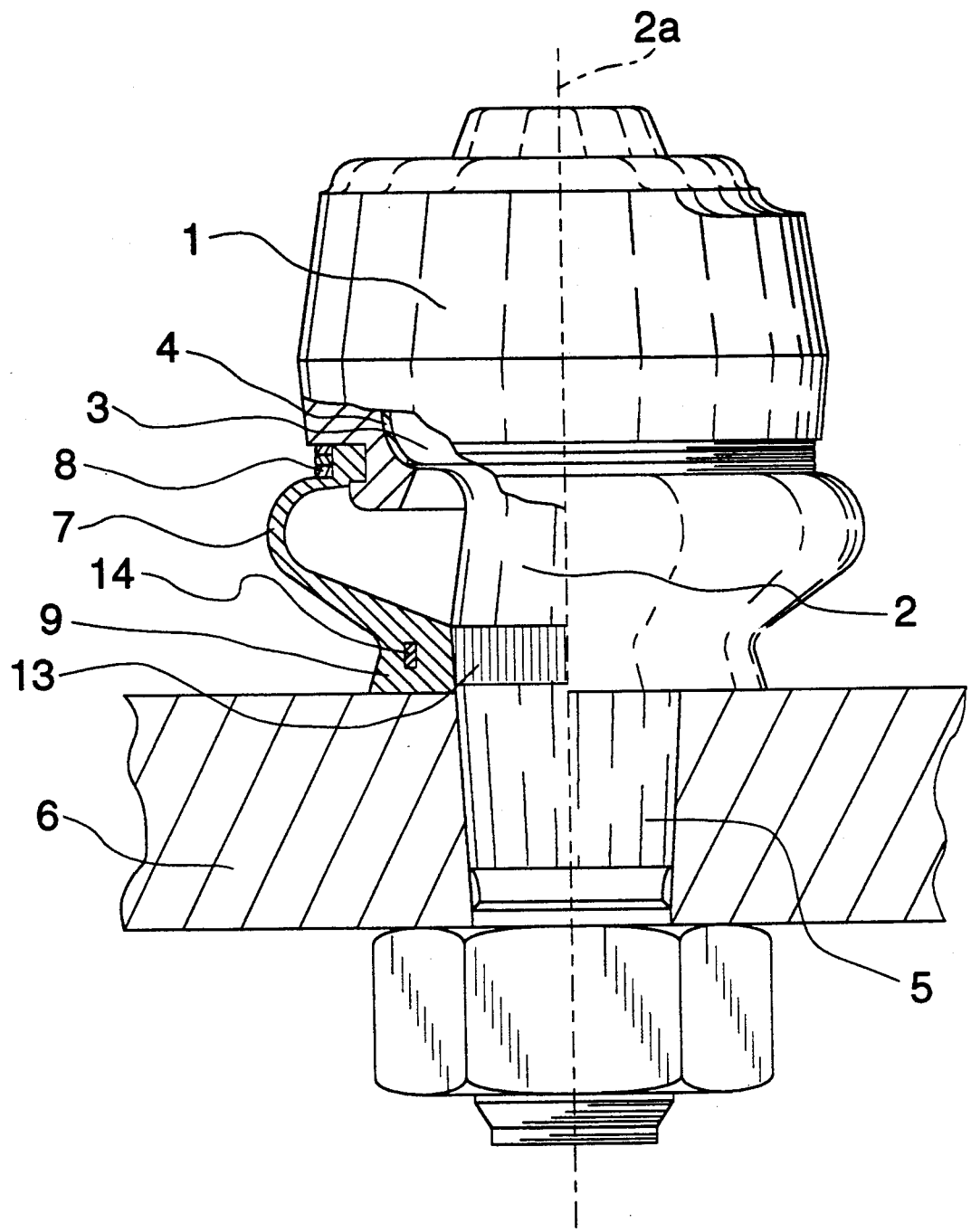
FIG. 3 is a side view corresponding to FIG. 1 of a modified embodiment of the invention.

FIG. 3 shows a positive-locking connection between the edge profile 9 on the shaft part 5 of the ball pivot 2 with a fluted or knurled area 13 on the circumference of the shaft part 5 of the ball pivot 2. Into the depressions of the area 13 the material of the undersized edge profile 9 of the sealing cuff 7 penetrates. This also brings about positive-locking, firm connection between the edge profile 9 of the sealing cuff 7 and the shaft part 5 of the ball pivot 2. This firm connection can be supported by embedding a retaining ring 14 in the material of the edge profile 9 of the sealing cuff 7 instead of an outer circumferential retaining ring 10. The design of this positive-locking connection between the edge profile 9 of the sealing cuff 7 and a fluted area 13 provided at the inner end of the shaft part 5 of the ball pivot 2 is illustrated in FIG. 3a on an enlarged scale compared with the scale of FIG. 3.

Figure 4:
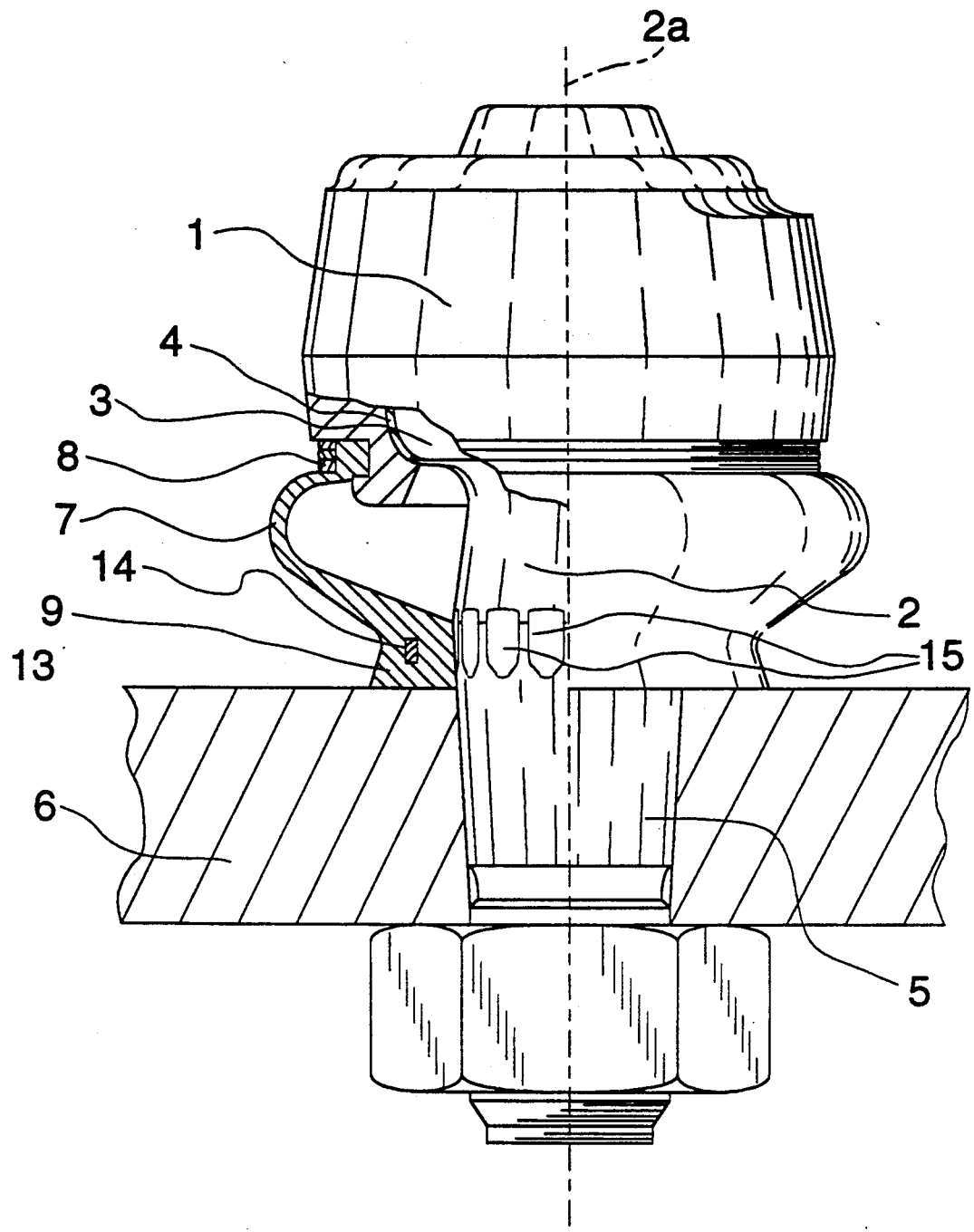
FIG. 4 is a side view corresponding to FIG. 1 of another embodiment of the invention.

FIG. 4 shows an embodiment in which the inner end of the shaft part of the ball pivot 2 is provided on its circumference with flattened Zones 15, chamfered zones or the like, so that a polygon, with which the undersized edge profile 9 of the sealing cuff 7 comes into contact while undergoing elastic deformation, is formed in the area of the fastening of the edge profile 9 of the sealing cuff 7. Also, in this embodiment, the positive-locking connection between the edge profile 9 and the shaft part 5 can be supported by a retaining ring 14 embedded in the material of the edge profile 9 or, if desired, also by an outer circumferential retaining ring 10, as is shown in FIGS. 1 and 2. FIG. 4a shows the cross section of the inner end of the shaft part 5 in the area of the flattened zones 15.

Figure 5:
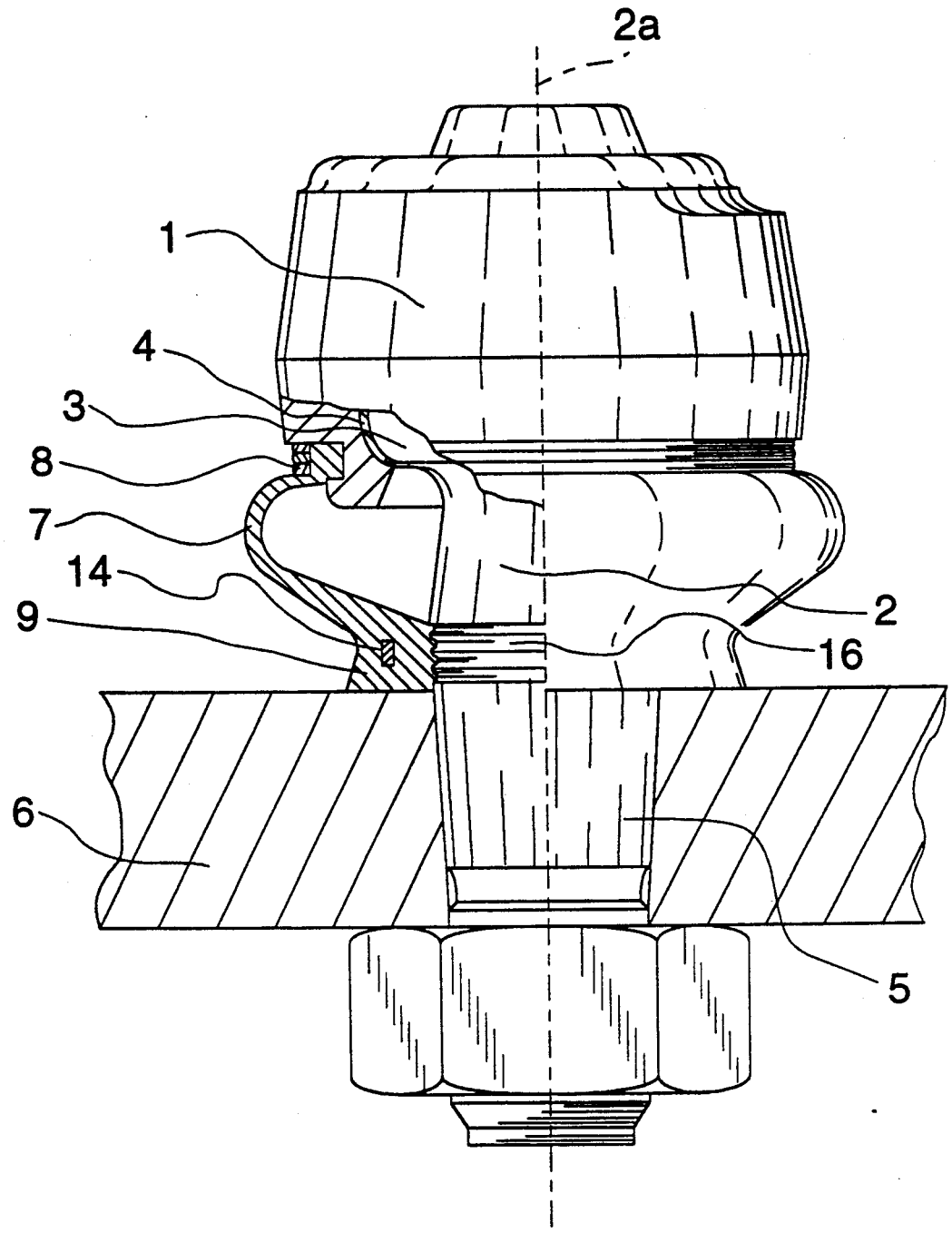

In the embodiment shown in FIG. 5, annular grooves 16, a helix or the like, are provided on the inner end of the shaft part 5, so that the elastic material of the undersized edge profile 9 penetrates into the grooves or furrows in order to produce the positive-locking connection between the edge profile 9 and the shaft part 5. The retaining ring 14 embedded in the material of the edge profile 9 ensures sufficient radial forces for the stability of the positive-locking connection.

The retaining rings 10 and 14 described may also be replaced with other, known strap retainers. The positive-locking connection between the edge profile 9 and the inner end of the shaft part 5 can also be improved by introducing adhesives 20 between the edge profile 9 and the shaft part 5 or it may consist exclusively of such an adhesive connection.

While specific embodiments of the invention have been shown and described in detail to illustrate the application of the principles of the invention, it will be understood that the invention may be embodied otherwise without departing from such principles.

What is claimed is:

1. A ball joint for motor vehicles, comprising:
a housing having an outer circumference, said outer circumference including an annular groove; a joint ball positioned in said housing, said joint ball including a ball pivot extending therefrom; a sealing cuff formed of an elastically deformable material, said sealing cuff including an end which is fastened in said annular grove about the outer circumference of said housing and said sealing cuff including another end with an edge profile surrounding said ball pivot, sealingly in a positive locking manner with respect to an axial direction; rotational positive-locking means for positively connecting said sealing cuff to said ball pivot, and including an inner non circularly shaped annular surface portion of said sealing cuff edge profile and an outer non circularly shaped peripheral surface portion of said ball pivot which engage each other for preventing relative rotational movement and for preventing relative axial movement, said sealing cuff including rotary elasticity means for compensating for a maximum rotary and swivelling movement of said ball pivot with respect to said housing.

2. A ball joint according to claim 1, wherein said edge profile of said sealing cuff includes a support ring firmly connected to said sealing cuff, said support ring being connected to said ball pivot in a positive-locking manner with respect to a direction of rotation around a longitudinal axis of said ball pivot.

3. A ball joint according to claim 1, wherein said edge profile of said sealing cuff is formed such that an annular seating surface of said sealing cuff is undersized compared with a seating surface of said ball pivot, said annular seating surface of said seating cuff being pressed onto said ball pivot.

4. A ball joint according to claim 1, wherein a seating surface of said edge profile of said sealing cuff and a seating surface of said ball pivot are formed as congruent polygons.

5. A ball joint according to claim 1, wherein a seating surface of said edge profile of said sealing cuff and a seating surface of said ball pivot are each provided with one of cooperating grooves fluted zones and knurled areas.

6. A ball joint according to claim 1, wherein said rotational positive locking means includes a support ring connected to said sealing cuff, said support ring having an inner annular surface shaped to engage said outer non circularly shaped peripheral surface portion to prevent relative rotation of said support ring with respect to said ball pivot.

7. A ball joint for motor vehicles, comprising:
a housing having an outer circumference, said outer circumference including an annular groove;
a joint ball positioned in said housing, said joint ball including a ball pivot extending therefrom, said ball pivot having an outer circumferential surface defining a seating surface;
a sealing cuff formed of an elastically deformable material, said sealing cuff including an end which is fastened in said annular groove about the outer circumference of said housing, and said sealing cuff including another end with an edge profile and having an inner annular surface;
rotational and axial positive-locking means including a non circularly shaped region formed on said inner annular surface and a non circularly shaped region formed on said seating surface of said ball pivot, said non circularly shaped region formed on said inner annular surface and said non circularly shaped region formed on said seating surface being matched to interengage for preventing relative rotational movement between said sealing cuff and said ball pivot, said seating surface preventing relative axial movement between said sealing cuff and said ball pivot, said sealing cuff being formed of elastic material providing rotary elasticity means for compensating for a maximum rotary and maximum swivelling movement of said ball pivot with respect to said housing.

8. A ball joint according to claim 7, wherein said positive-locking means comprises said non circularly shaped regions cooperating to form congruent polygons to prevent relative rotational movement.

9. A ball joint according to claim 7, wherein said rotational and axial positive-locking means includes one of grooves, fluted zones and knurled areas formed on said seating surface, said inner annular surface of said sealing cuff penetrating radially inwardly into said one of cooperating grooves, fluted zones and knurled areas to prevent relative rotation between said sealing cuff and said ball pivot.

10. A ball joint according to claim 7, wherein said rotational and axial positive-locking means includes an inner annular seating surface of said sealing cuff which is undersized compared with said seating surface of said ball pivot, and said sealing cuff seating surface is pressed onto said ball pivot seating surface.

11. A ball joint for motor vehicles, comprising:
a housing having an outer circumference, said outer circumference including an annular groove;
a joint ball positioned in said housing, said joint ball including a ball pivot extending therefrom;
a sealing cuff formed of an elastically deformable material, said sealing cuff including an end which is fastened in said annular groove about the outer circumference of said housing, said sealing cuff including another end with an edge profile surrounding said ball pivot;
axial positive-locking means provided on an inner surface of said edge profile and in a region on a peripheral surface of said ball pivot for preventing relative axial movement of said ball pivot and said sealing cuff
rotational positive locking means provided on said inner surface and on said peripheral surface in said region for preventing relative rotational movement of said ball pivot and said sealing cuff, said rotational positive-locking means including a non circularly shaped portion of said peripheral surface which engages a corresponding non circularly shaped region of said inner surface of said edge profile, and said axial positive-locking means includes an angled region defined by said shaped peripheral surface.

12. A ball joint according to claim 11, wherein said axial positive-locking means includes a shaped portion on said peripheral surface of said ball pivot and a corresponding matched shaped portion on said inner surface of said edge profile, said shaped portion having a plurality of grooves extending along a portion of a length of said ball pivot, and said rotational positive locking means includes adhesive applied between said grooves and said edge profile.

* * * * *